United States Patent [19]
DeBan et al.

[11] Patent Number: 5,386,103
[45] Date of Patent: Jan. 31, 1995

[54] IDENTIFICATION AND VERIFICATION SYSTEM

[75] Inventors: Abdou F. DeBan; Tianning Xu, both of Dayton; David M. Tumey, Huber Heights; Craig M. Arndt, Dayton, all of Ohio

[73] Assignee: Neurnetics Ltd., Dayton, Ohio

[21] Appl. No.: 87,657

[22] Filed: Jul. 6, 1993

[51] Int. Cl.⁶ ............................................. G06F 15/30
[52] U.S. Cl. ..................................... 235/379; 235/487
[58] Field of Search ................................. 235/379, 487

[56] References Cited

U.S. PATENT DOCUMENTS

| | | |
|---|---|---|
| 4,825,050 | 4/1989 | Griffith et al. |
| 4,849,613 | 7/1989 | Gisele |
| 4,868,877 | 9/1989 | Fischer |
| 4,904,851 | 2/1990 | Yukino |
| 4,972,476 | 11/1990 | Nathans ............... 380/23 |
| 4,980,567 | 12/1990 | Crane et al. |
| 4,998,279 | 3/1991 | Weiss |
| 5,055,658 | 10/1991 | Cockburn |

FOREIGN PATENT DOCUMENTS 0247788 12/1987 European Pat. Off.
2173970 10/1986 United Kingdom.

Primary Examiner—Harold Pitts
Attorney, Agent, or Firm—R. William Graham

[57] ABSTRACT

An identification and verification system which includes a card, or the like, having stored thereon human facial image projection characters, means for retrieving the human facial image projection characters and manipulating the same to produce an output signal indicative of a human facial feature for use in identification and verification. The retrieving means includes universal face space (UFS) memory indicative of facial features for a non-homogeneous population wherein the output signal is generated by projecting the projection characters into the UFS memory.

14 Claims, 4 Drawing Sheets

IDENTIFICATION AND VERIFICATION SYSTEM

BACKGROUND OF THE INVENTION

This invention relates generally to automated banking systems, and more particularly, it relates to a system of cashing documents like checks, which in one case utilizes a customer-operated, automated teller machine (ATM), and in another case, in cooperation with equipment at a tellers station where a human teller also participates in the identification and verification of the customer. This invention also relates to controlling direct access to secure areas by verification of an individuals identity.

There have been many efforts to reduce the number of fraudulent transactions which occur with the use of ATM machines, as well as, the unauthorized cashing of checks at teller stations. A relatively large percentage of teller transactions at a typical bank amounts to cashing checks. In an effort to curb the fraudulent transactions which occur in these circumstances, present ATM machines require use of a user card which has a personal identification number PIN encoded onto a magnetic strip on the back of the card. The PIN has been found unacceptable as a means of a security mechanism to prevent unauthorized transactions. In the case of a human teller, the teller not infrequently fails to gain proper identification from the customer and as a consequence allows for fraudulent conveyances to occur. Other attempts have utilized voice recognition or retinal recognition characteristics but have been found impractical for large groups of individuals due to the relatively high, storage space required for their operation and not usable for some individuals having a disabling condition prohibiting their use of such systems. In addition, numerous attempts have been made to automatically control and regulate access to secured areas and other computer based accounts.

SUMMARY OF THE INVENTION

It is an object of the present invention to provide for an improved customer identification and verification system for verifying individual identity before access is granted to a facility or a transaction such as cashing of documents, such as checks.

It is an other object of the present invention to provide for a relatively efficient and rapid identification and verification of a customer exercising a cash transaction while minimizing the amount of fraudulent transactions which occur.

It is a further object of the present invention to provide for a non-intrusive automatic verification and identification system for a customer utilizing either a human or automated teller for the purpose of a cash transaction, or other such access. The face-based identification system as described herein does not require active participation by the customer.

Accordingly, the identification and verification system according to the present invention comprises user means for presenting and storing a human facial image projection character and means for retrieving the human facial image projection character from the user means and capable of manipulating the projection character to produce an output signal indicative of a human facial feature for use in verification of the user, the retrieving means includes universal face space memory indicative of facial features for a non-homogeneous population and wherein the output signal is generated by projecting the human facial image projection character into the universal face space memory.

The user means is further characterized to include a set of human facial image projection characters and the receiving and manipulating means is further characterized to manipulate the set of projection characters to produce an output signal indicative of a human facial image. The system further includes means for receiving and displaying said human facial feature output signal.

Video camera means for gathering a human facial image are provided with means for digitizing the human facial image and for producing a digitized output signal, wherein the retrieving and manipulating means is further capable of receiving the digitized output signal to produce another human facial image projection characters, and further includes means for comparing the human facial image projection character and the another human facial image projection character and providing an output signal indicative of a positive or negative identification.

In describing the invention further, the invention is directed to an instrument for granting access to banking accounts, having a face decomposition data stored thereon in an encoding medium, means for reading the decomposition data from the encoding medium, and means operatively associated with the reading means for receiving the decomposition data and manipulating the data to produce an output signal indicative of general and specific characteristics of a human face, and means for receiving the output signal and displaying the output signal in a visual manner. In another embodiment, the system also includes means for obtaining one or more facial images, means associated with said image obtaining means for digitizing the facial images, means for transforming the digitized image signals to face space and means for comparing the decomposition data and the transformed output signal to produce a signal indicative of a positive or negative identification, and means for receiving the identification signal and producing an output which is recognizable to the teller.

The system of the present invention is relatively simple to construct and inexpensive to implement into existing banking systems such as a ATM or security system. The eigenvectors face-based image representation obtains the highest level of image compression theoretically possible. These and other advantages will be more readily understood in connection with the following specification, drawing, and claims.

DETAILED DESCRIPTION OF THE PREFERRED EMBODIMENTS

Figure 1:
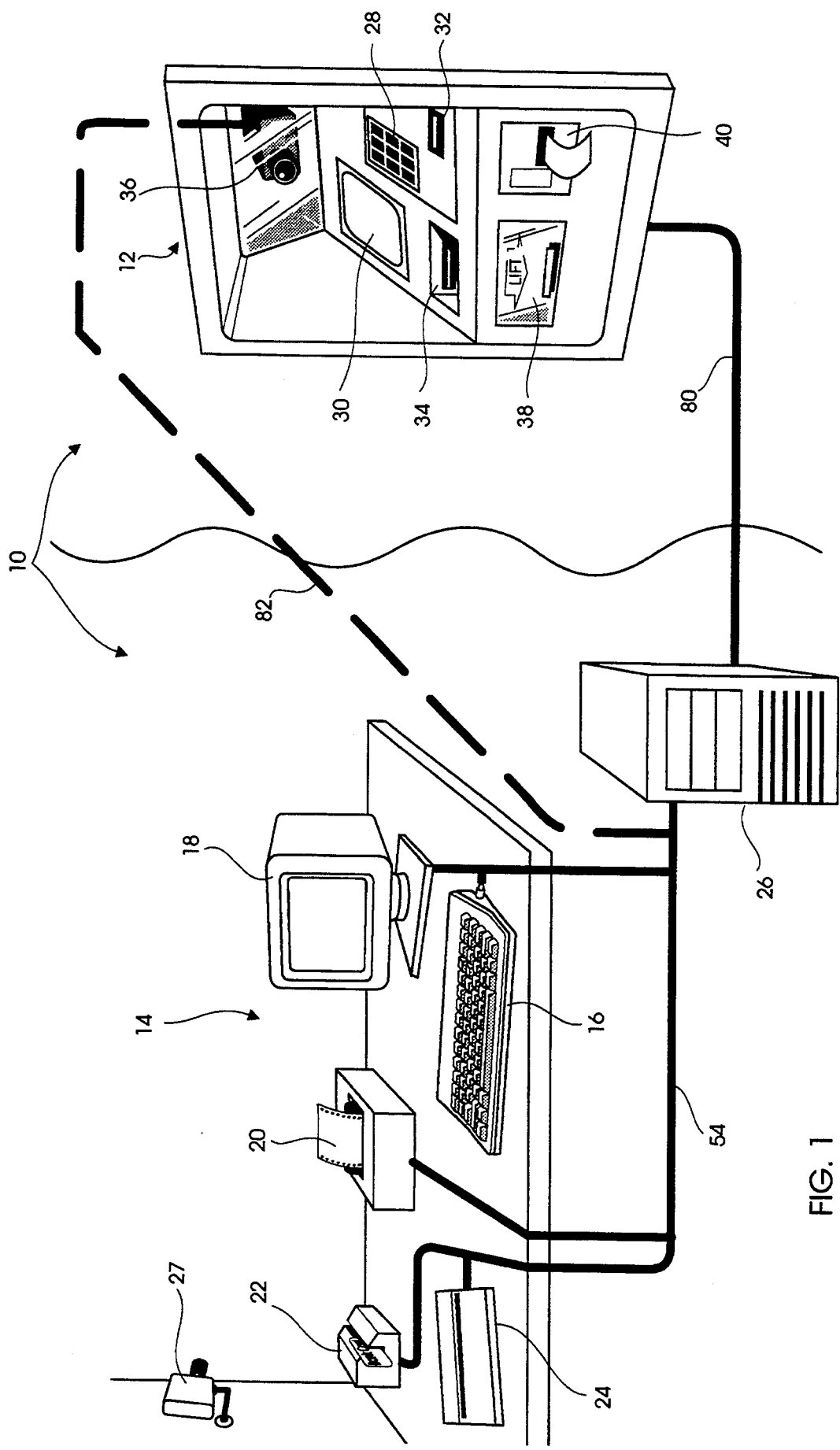
FIG. 1 is a perspective view of the apparatus of the present invention which includes a modified teller station.

Referring to the drawings, FIG. 1 is a perspective view of the system 10 for cash transactions utilizing instruments such as checks or ATM cards. The system shows a modified ATM 12, and a modified teller station 14. The ATM 12 is operated by customer and the teller station 14 is operated by a human teller; however, the ATM 12 and the teller station 14 are operatively connected as will be described hereinafter.

Figure 3:
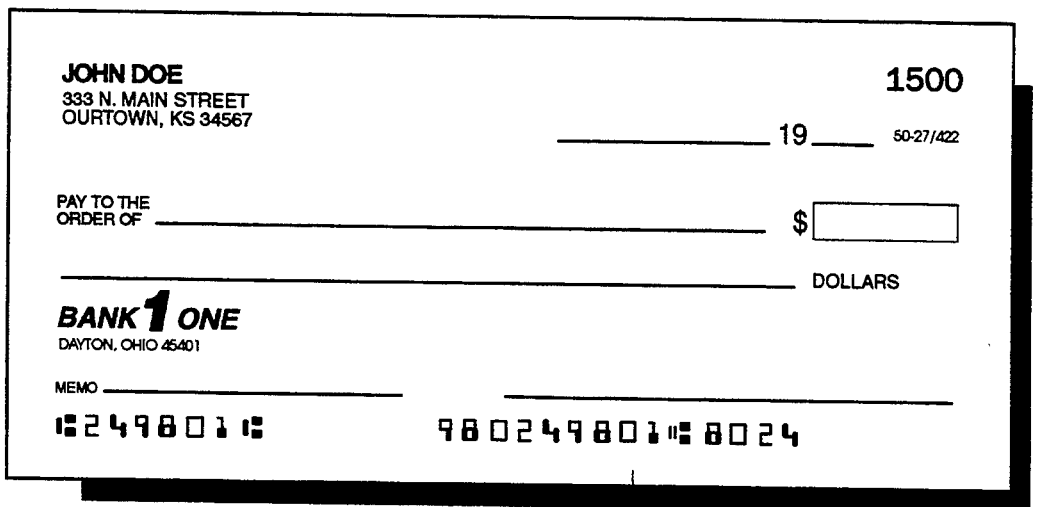
FIG. 3 is a diagram of an instrument such as a check which is processed by the apparatus shown in FIG. 1.

The system 10 includes the teller station 14 which includes a keyboard 16 for entering data, a display 18 such as a high resolution digital video monitor for communicating with the teller, a voucher/journal printer 20 for printing on deposit slips, for example, a magnetic strip or card reader 22 for reading magnetic strips on cards such as bank identification cards, a conventional magnetic ink character recognition (MICR) reader 24 for reading MICR data on checks 25 such as that shown in FIG. 3, for example. Also included is means 27 for generating image data of the customer, such as a high resolution camera or digital ccd array. The teller station 14 is operatively connected to a central processing unit 26, which will be described further hereinafter.

Figure 4:
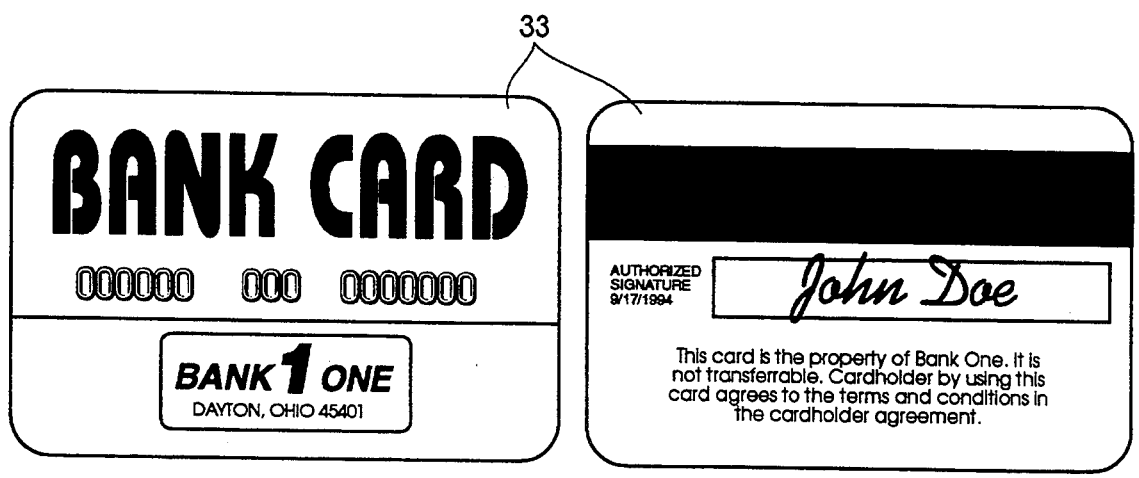
FIG. 4 is a diagram of an instrument like an ATM card for use in processing with the apparatus shown in FIG. 1.

The automated teller station 12 likewise includes a keyboard 28 for entering data, a display such as a cathode ray tube (CRT) 30 for communicating with the customer, a magnetic strip reader 32 for a card with a magnetic stripe, such as an ATM card 33 shown in FIG. 4, a conventional MICR reader 34 for a check, for example, means for generating an image data of the customer 36, such as a high resolution tv camera or digital ccd array, a cash dispenser 38 for dispensing bills or currency, a receipt printer 40 for printing receipts to be given to a customer such as, for example, a deposit or withdrawal receipt. The ATM 12 is operatively connected to CPU 26 in a manner which will be described hereinafter.

Figure 2:
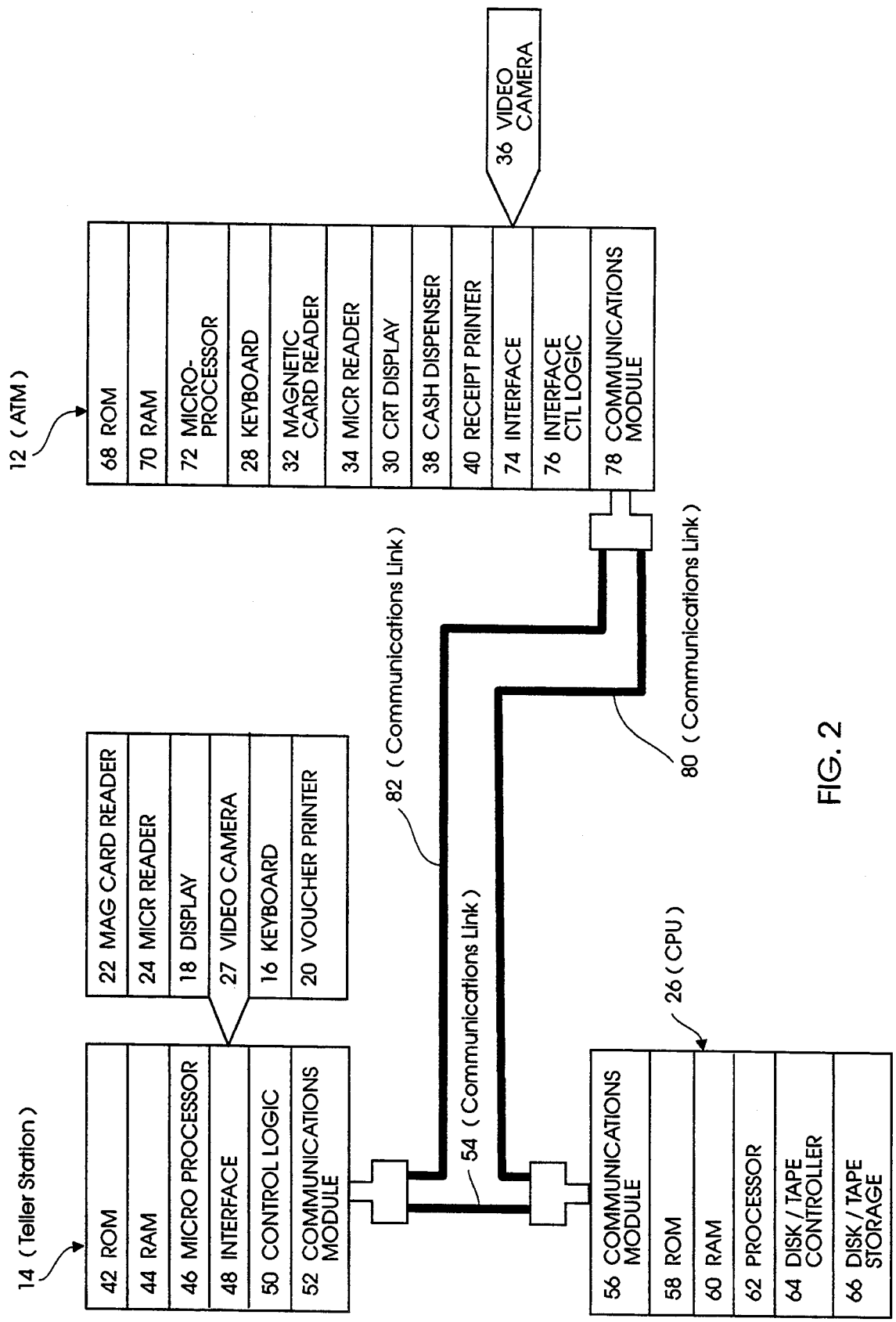
FIG. 2 is block diagram representing the present invention.

Referring to FIG. 2, the teller station 14 also includes a high resolution camera 36, a read only memory (ROM) 42 for storing certain instructions, a random access memory (RAM) 44 for temporary memory storage, a micro processor (MP) 46 for executing instructions, an interface 48 described later hereinafter, interface and control logic 50 for interconnecting the components associated with the teller station 14, and a communication module 52 to enable the teller station 14 to communicate with the CPU 26 through communication link 54, the communication module 52 is of a type known to the art. The communication link 54 is of a conventional type known to the art which is a high speed synchronized, communications format type, as is used with the communication module 52. The CPU 26 includes novel features of the present invention which will be described in detail hereinafter. The central processing unit 26, otherwise referred to as a branch controller, includes a communication module 56 coupled to the communications link 54 by which it communicates with the teller station 14 and the ATM 12.

The CPU 26 includes a ROM 58 where certain programs or procedures are stored, a RAM 60 for providing temporary storage for processing data or for storing application programs, and a processor 62 for executing the instructions and application programs from the ROM 58 and/or RAM 60. The CPU 26 also includes a disk/tape controller 64 which is coupled to the disk/tape storage 66 where extensive data storage may be had. In this regard, the disk storage 66 contains a data base associated with the bank's customers. The data base associated with the present invention will include current monetary balances for various account numbers, names and addresses of account holders, and a Universal Face Space (UFS) for identifying and verifying a customer. The UFS will be described in detail later. The CPU 26 is operatively connected to a display keyboard and interface and control logic of the type described above.

Similarly, the ATM 12 also includes a ROM 68 where instruction and routines are stored, a RAM 70 for providing temporary storage, a micro processor 72 for executing instructions, interface 74, interface and control logic 76, and interface and communication modules 78. Communication links 80 and 82 are coupled to the communication modules 56 and 52, respectively, and allow for communication between the ATM 12 and the CPU 26 and the teller 14, respectively.

Figure 5:
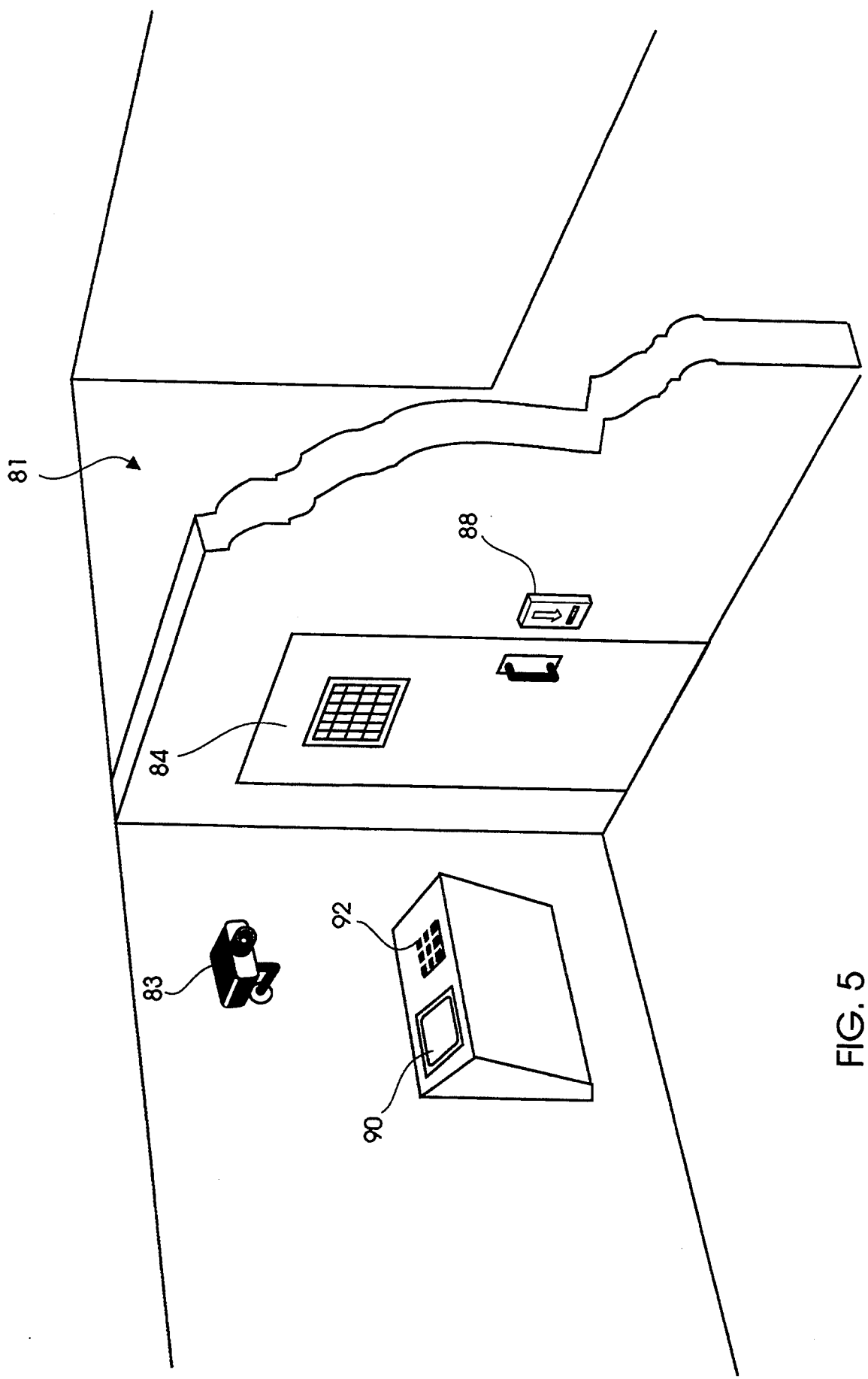
FIG. 5 is an example of a typical arrangement of the apparatus for use in secure area access.

Referring to FIG. 5, another embodiment is directed to a secure area access system 81 which includes a high resolution camera 83, a video display and terminal unit 90, a keyboard 92, a secure door 84, and an automatic locking mechanism 88, such as is found with several conventional components known in the art. Additionally, system 81 includes ROM, RAM, micro processor, interface, interface and control logic, interface and control logic, communication modules, communications links coupled to the communication modules and CPU similarly as described above.

The identification and verification elements utilized in the present invention is described as follows. The CPU has stored on its disk UFS. The UFS is comprised of UFS memory having general and specific characteristics of non-homogeneous faces which comprise the human population. The UFS memory of the general type includes characteristics to all human faces, e.g. relative placement of features such as nose, eyes, mouth, and the general orthographic structure of a face. The UFS memory of the specific type is representative of unique characteristics of human subtypes, e.g. race, gender, genetic and/or traumatic anomalies.

Facial image characteristic data is gathered using the digital video camera 27 and a computer image digitizer 18, the camera 27 focuses, normalizes light level and image scales the subject face. A pre-processing module performs the object centering and segmentation, wherein the segmentation function is implemented using a two dimensional guassian technique with a window centered on the center of the face. In this regard, a pre-processing equation of the following formula maybe utilized: The images are digitized, in this case utilizing a computer image digitizer characterized by a 256 by 256 pixel array. Generally, the n×n pixel image is defined as a vector:

$$\bar{x}^i = \begin{pmatrix} x^i_1 \\ x^i_2 \\ \cdot \\ \cdot \\ \cdot \\ x^i_{n2} \end{pmatrix}$$

where $\bar{x}^i$ is the vector describing the $i^{th}$ image an the $x^i_l$ is the first pixel of the $i^{th}$ image. A mean vector, $\bar{m}x$ is calculated by averaging each pixel over all M faces in the training set $$\vec{m}_x = 1/M \sum_{i=1}^{M} \vec{x}^i$$

where M is the number of faces in the training set and $x^i$ is the vector describing the $i^{th}$ face. A covariance matrix $C_x$ is calculated by way of $$C_x = 1/M \sum_{i=1}^{M} \vec{x}^i(\vec{x}^i - \vec{m}^i)(\vec{x}^i - \vec{m}^i)T$$

C results n×n matrix which has the general formula $$C_x = 1/M \begin{pmatrix} \sum_{i=1}^{M} x^i x^i & \sum x^i x^i & \cdots & \sum_{i=1}^{M} x^i x^2 \\ \vdots & \vdots & & \vdots \\ \sum_{i=1}^{M} x^{n2} x^i & \sum x^i x^i & \cdots & \sum x^{n2} x^{n2} \end{pmatrix}$$

where $x^i_l$ is the first pixel of the $i^{th}$ image. The covariance matrix represents information content or relative change in each image. By finding the covariance between the first pixel and every other pixel in the image, a judgment can be made as to the amount of information in the first pixel. For example, a pixel that does not change relative to other pixels provides little information, while a pixel with high covariance provides more information. Eigenvectors and eigenvalues of the covariance matrix transform the covariance matrix into the UFS. Thus, the relative pixel changes are mapped into the universal face space. This transformation represents an optimum distance between vectors and minimum decision errors, which is the goal in identification. The k highest valued eigenvectors are selected to create a basis set with only the largest variance eigenvectors. Generally, the number of eigenvectors to be kept for reconstruction or recognition of a facial image is determined using the means square error (MSE) between the reconstruction vector $\vec{x}$ and the original image $\vec{x}$ which is $$MSE = \sum_{j=1}^{n^2} \lambda_j^2 - \sum_{j=1}^{k} \lambda_j^2 \rightarrow \sum_{j=k+1}^{n^2} \lambda_j^2$$

where $\lambda_j$ is the eigenvalue, n is the total number of eigenvalues, and k is the number of eigenvectors used for reconstruction. The k largest eigenvalued eigenvectors are selected resulting in $$u = \begin{pmatrix} e_{11} & e_{12} & \cdots & e_{1n2} \\ e_{21} & e_{22} & \cdots & e_{2n2} \\ \vdots & \vdots & & \vdots \\ e_{n1} & e_{n2} & \cdots & e_{n2n2} \end{pmatrix}$$

where u is the truncated matrix, $e_{kn}$ is the $n^{th}$ value of the $k^{th}$ eigenvector. Each row represents a single eigenface, and k basis functions define the space. In the vector form, the original image x is transformed by $$Y_k = m_k(X - M_x) k = 1 \ldots M$$

where $Y_k$ is the $k^{th}$ element of the projection vector, $\vec{y}$, in the universal face space, $u_k$ is the $k^{th}$ eigenvector, $\vec{x}$ is the original image, and $m_x$ is the mean face. In the universal face space, $\vec{y}$ represents an image in the coordinate system defined by the eigenvectors. For example, a single projection vector represents a single human facial feature. A set of projection vectors represents a human facial image. For purposes of the invention, the term "projection character" is construed to include both "projection vector" and "projection vector coefficient".

To reconstruct the original image, multiply the y vector by the inverse transformation, $u^{-1} = U^T$, and add the mean face $$\vec{\tilde{x}} = \left( \sum_{k=1}^{M} \vec{u}_k T y_k \right) + \vec{m}_x$$

$\tilde{x}$ is the reconstructed image, $\vec{u}_k$ is the $k^{th}$ eigenface, $\vec{y}_k$ is the $k^{th}$ coefficient mean $m_x$ is average face, and M is the number of images in the training set. Thus, a data base can be created which includes a defined number of eigenfaces to represent non-homogeneous faces in the human population.

Once the UFS is created and integrated into the CPU 26, the system 10 can be utilized in the following manner. A new customer opening an account will be non-invasively photographed via the camera 27 so that one or more video images of the customer's face can be digitally processed. The first step in the eigenface decomposition is digital image preprocessing. The purpose of preprocessing is to position the face in the pixel image space correctly, and to eliminate artifacts and distractors which may diminish the accuracy of the system. The system 10 uses several preprocessing techniques, including, median filtering, gaussian windowing, and feature recognition, etc. Upon processing the facial images to derive a digitized image, a transformation is performed to produce a set of projection vector coefficients which represents the image in the universal face space. These projection vector coefficients can be transferred and stored to a medium, such as a magnetic strip on a card or magnetic ink characters on a check.

Once the projection vector coefficients are stored on the instrument, such as check 25 with magnetic ink characters, the user passes the check through reader 24 which can be used to generate a face image by transforming and digitizing the coefficients tg the CPU 26 wherein the transformed projection vectors are projected into the UFS to produce a reconstruction signal indicative of a face and the CPU 26 manipulates the reconstruction signal and transmits the same through the communication link 54 where it is received at the teller station 14 through communication module 52 wherein the micro processor 46 manipulates the signal to produce a visual signal and transmits the signal to the computer image digitizer display 18.

Concurrently, the digital ccd array 27 is actively processing facial images of the customer, digitizing the images in a manner described above i.e., using up front preprocessing, face centering, guassian windowing, artifact removal by median filtering, etc., transforming the digitized information to the UFS as described above to produce a reconstruction of a second set of facial coefficients. At this step, a neural network located in CPU 26, for example, can be utilized to conduct a comparison between the coefficients stored on the medium and the coefficients generated from the projection vectors taken from the live images as the customer is utilizing the teller station 14. K-means or another suitable statistical method can be utilized to compare the coefficients.

Here, the neural network would, for example, include at least one layer of trained neuron-like units and preferably at least three layers. The neural network would include an input layer, a hidden layer, and an output layer. Each of the input, hidden, and output layers would include a plurality of trained neuron-like units.

The neuron-like units can be in the form of software or hardware. The neuron-like units of the input layer include a receiving channel for receiving the digitized information generated as described above to the neural network which is associated with the CPU 26. The receiving channel includes a predetermined modulator for modulating the digitized signal.

The neuron-like units of the hidden layer are individually receptively connected to each of the units of the input layer. Each connection includes a predetermined modulator for modulating each connection between the input layer and the hidden layer. The neuron-like units of the output layer are individually receptively connected to each of the units of the hidden layer. Each connection includes a predetermined modulator for modulating each connection between the hidden layer and the output layer. Each unit of the output layer includes an outgoing channel for transmitting the modulated signal.

Each trained neuron-like unit includes a dendrite-like unit and preferably several, for receiving the digitized signals from the stored media, for example, and preferably several, for receiving incoming digitized signals. Each dendrite-like unit includes a particular modulator which modulates the amount of weight which is to be given to a particular characteristic sensed. The modulator modulates the incoming signal and subsequently transmits a modified signal. For software applications, the dendrite-like unit comprises an input variable xa and a weight value wa wherein the connection strength is modified by multiplying the variables together. For hardware, the dendrite-like unit can be a wire, optical or electrical transducer having a chemically, optically, or electrically modified resistor therein.

Each neuron-like unit includes soma-like unit which has a threshold barrier defined therein for the particular characteristic sensed. When the soma-like unit receives the modified signal, this signal must overcome the threshold barrier where upon a resulting signal is formed. The soma-like unit combines all resulting signals and equates the combination to a verification output signal indicating either a positive or negative identification of the customer. For software, the soma-like unit is represented by the sum of $S = \Sigma_a X_a W_a - T$, where T is the threshold barrier. This sum is employed in a non linear transfer function (NTF) as defined below. For hardware, the soma-like unit includes a wire having a resistor; the wire is terminated at a common point which feeds into an operational amplifier having a non linearity part which can be a semi-conductor, diode or transistor.

The neuron-like unit includes an axon-like unit through which the output signal travels and also includes at least one bouton-like unit, and preferably several, which receive the output signal from the axon-like unit. Bouton/dendrite linkages connect the input layer to the hidden layer and the hidden layer to the output layer. For software the axon-like unit is a variable which is set equal to the value obtained through the NTF and the bouton-like unit is a function which assigns such value to a dendrite-like unit of the adjacent layer. For hardware, the axon-like unit and bouton-like unit can be a wired, optical or electrical transmitter.

The modulators of the input layer modulate the amount of weight to be given to the different interrelationship between the two sets of coefficients, e.g. the newly generated coefficients for eye, nose, and mouth placement, gender, race genetic or traumatic anomaly and those corresponding coefficients generated from the UFS. For example, if a customers eye placement is too narrow or too wide or in accordance with what has been predetermined as normal based on the information generated from the stored medium, the soma-like unit would account for this in its output signal and bear directly on the neural networks decision to produce a positive or negative identification. The modulators of the output layer modulate the amount of weight to be given for indicating a positive or negative identification. It is not exactly understood what weight is to be given to characteristics which are modified by the modulators of the hidden layer, as these modulators are derived through a training process defined below.

The training process is the initial process which the neural network must undergo to obtain and assign appropriate weight value for each modulator. Initially, the modulators and the threshold barrier are assigned small random non-zero values. The modulators can be assigned the same value but the neural networks learning rate is best maximized if random values are chosen. The data used to generate the universal face space are fed in parallel into the dendrite-like units of the input layer and the output is observed.

The NTF employs S in the following equation to generate the output:

$$NTF = \frac{1}{[1 + e^{-S}]}$$

For example, in order to determine the amount of weight to be given to each modulator for gender coefficient, the NTF is employed as follows:

If the NTF approaches 1, the soma-like unit produces an output indicating a positive gender identification. If the NTF is within a predetermined range of about 0.5 the soma-like unit produces an output signal indicative of no gender identification and is accordingly given little weight in the determination. If the NTF approaches 0, the soma-like unit produces an output signal indicative of a negative gender identification. If the output signal clearly conflicts with the known input data, an error occurs. The weight values of each modulator are adjusted using the following formula so that the input data produces the desired output signal.

For the output layer:

$W^*_{kol} = W_{kol} + GE_k Z_{kos}$ $W^*_{kol}$ = new weight value for neuron-like unit k of the output later.

$W_{kol}$ = actual current weight value obtained for neuron-like unit k of the output layer.

G = gain factor (usually less than 1.0)

$Z_{kos}$ = actual output signal of neuron-like unit k of output layer.

$D_{kos}$ = desired output signal of neuron-like unit k of output layer.

$E_k = Z_{kos}(1-Z_{kos})(D_{kos}-Z_{kos})$, (this is an error term corresponding to neuron-like unit k of output layer).

For the hidden layer:

$W^*_{jhl} = W_{jhl} + GE_j Y_{jos}$ $W^*_{jhl}$ = new weight value for neuron-like unit j of the hidden layer.

$W_{jhl}$ = actual current weight value obtained for neuron-like unit j of the hidden layer.

G = gain factor (usually less than 1.0)

$Y_{jos}$ = actual output signal of neuron-like unit j of hidden layer.

$E_j = Y_{jos}(1-Y_{jos})\Sigma_k E_k W_{kol}$, (this is an error term corresponding to neuron-like unit j of hidden layer over all k units).

For the input layer:

$W^*_{iil} = W_{iil} + GE_i X_{ios}$ $W^*_{iil}$ = new weight value for neuron-like unit i of input layer.

$W_{iil}$ = actual current weight value obtained for neuron-like unit i of input layer.

G = gain factor (generally less than 1)

$X_{ios}$ = actual output signal of neuron-like unit i of input layer.

$E_i = X_{ios}(1-X_{ios})\Sigma_j E_j W_{jhl}$, (this is an error term corresponding to neuron-like unit i of input layer over all j units).

The training process entails entering data iteratively while observing the output signal $Z_{kos}$. If the output signal is again in error with what the known desired output signal should be, the weights are adjusted again in the manner described above. This process continues until the output signals are substantially in accordance with the desired output signal, then the weights of the modulators are fixed.

In a similar fashion, the NTF is used so that the soma-like units can produce output signals for nose placement, mouth placement, general orthographic structure of face, race, genetic or traumatic anomalies, etc. When these signals are substantially in accordance with the known output signals, the weights of the modulators are fixed.

Upon fixing the weights of the modulators, predetermined face space memory indicative of the presence or absence of each of the above described characteristics are established. The neural network is then trained and can make generalizations about input data by projecting input data into the face space memory which most closely corresponds to that input data.

If the identification and verification process described above indicates a difference between the customers identification data and his/her generated image data after some fixed number of attempts, a rejection is displayed on the display 18 and the teller takes action accordingly.

Alternatively, the ATM 12 is utilized in a similar manner to that of the teller station 14. The user swipes the ATM card 33, for example, through the card reader 32 where the projection vector coefficients are transmitted to the central processing unit 26 and facial coefficients are reconstructed in a manner similar to that described above, i.e. from the projection vector coefficients and the UFS.

If the identification and verification process described above indicates a difference between the customers card-identification data and his/her generated image data after some fixed number of attempts, a rejection is displayed on the CRT 30 requesting the customer to contact the bank for assistance.

For the ATM, assuming the customer is a valid one, the ATM 12 will display on its CRT 30 a menu or list of services which are offered by the ATM 12. The list of services may include cash dispensing, receiving deposits, transferring funds from one account to another, and other typical ATM functions. With the present system 10, the additional service of cashing checks is provided. When the customer wishes to cash a check, he/she merely needs to use the conventional magnetic ink character recognition reader 34 to pass his check through in order to access the ATM, 12. Upon valid identification, the CRT 30 will prompt appropriate messages for check cashing. Additionally, it is conceived that deposit slips and savings pass books may have encoded, in a medium, the identification data similar to the customers checks, thereby enabling the customer to access the ATM 12 by passing the instrument through the magnetic ink character recognition reader as is similarly done for the check.

The check cashing operation procedures, the CRT 30 operations, and the application programs which reside in the CPU 26, and conventional communications techniques are employed to transfer data between the CPU 26 and the ATM 12 and teller 14 and are well known to the art.

While the preferred embodiment has been described in relation to utilizing teller stations, ATM's, it should be readily understood to those skilled in the art that the identification and verification system of the present invention can be applied to securities system, for example, or any system which so requires a personal identification. It is also to be noted that while the present invention employs the use of a particularly described output algorithm and the use of a neural network, it is conceived that other algorithms and/or statistical programming means can be used instead of or in conjunction with the embodiments provided for the present invention. It will also be readily apparent to those skilled in the art that many variations, modifications and derivations of the present invention are possible and of the preferred embodiment set forth above are not meant to be limiting of the full scope of the invention and as such the appended claims hereto should enjoy the full scope of protection afforded by equivalence thereof.

What is claimed is:

1. A non-invasive human user identification and verification system, comprising:
    user means for presenting and storing a human facial image projection character; and
    means for retrieving said human facial image projection character from said user means and capable of manipulating said projection character to produce an output signal indicative of a human facial feature for use in verification of the user, said retrieving means includes universal face space memory indicative of facial features for a non-homogeneous population and wherein said output signal is generated by projecting said human facial image projection character into said universal face space memory.

2. The system of claim 1, wherein said user means is further characterized to include a set of human facial image projection characters and said receiving and manipulating means is further characterized to manipulate said set of projection characters to produce an output signal indicative of a human facial image.

3. The system of claim 1, wherein said system further includes means for receiving and displaying said human facial feature output signal.

4. The system of claim 1, which further includes:
video camera means for gathering a human facial image;
means for digitizing said human facial image and for producing a digitized output signal, wherein said retrieving and manipulating means is further capable of receiving said digitized output signal to produce other human facial image projection characters, an further includes means for comparing said human facial image projection character and said other human facial image projection character and providing an output signal indicative of a positive or negative identification.

5. The system of claim 4, wherein said comparing means includes a neural network comprising:
an input layer including a plurality of neuron-like units, wherein each neuron-like unit includes a receiving channel for receiving one of said digitized output signal generated from said human facial image and said output signal generated from said universal face space, wherein said receiving channel includes predetermined means for modulating said one of said digitized output signal generated from said human facial image and said output signal generated from said universal face space;
a hidden layer having a plurality of neuron-like units individually receptively connected to each of said units of said input layer, wherein each said connection includes a predetermined means for modulating each said connection between said input layer and said hidden layer;
an output layer having a plurality of neuron-like units individually receptively connected to each of said units of said hidden layer, wherein each said connection includes predetermined means for modulating each connection between said hidden layer and said output layer, and wherein each said unit of said output layer includes an outgoing channel for transmitting a modulated signal indicative of a positive identification or negative identification.

6. The system of claim 4, which further includes means for receiving said identification output signal and displaying said identification output signal.

7. A document cashing system comprising:
user means for storing a human facial image projection character;
a machine for performing financial transactions including the dispensing of cash; said machine comprising:
means for retrieving said human facial image projection character and capable of manipulating said projection character to produce an output signal indicative of a human facial feature for use in verification of the user, which includes universal face space memory indicative of facial features for a non-homogeneous population and wherein said output signal is generated by projecting said human facial image projection character into said universal face space memory;
means for receiving and displaying said output signal of said human facial feature; and
means for manually entering data to perform said financial transactions.

8. The system of claim 7, wherein said user means is further characterized to include a set of human facial image projection characters and wherein said receiving and manipulating means is further characterized to manipulate said set of projection characters to produce an output signal indicative of a human facial image.

9. The system of claim 7, which further includes:
video camera means for gathering a human facial image;
means for digitizing said human facial image and for producing a digitized output signal, wherein said retrieving and manipulating means is further capable of receiving said digitized output signal to produce another human facial image projection character, and further includes means for comparing said human facial image projection character and said another human facial image projection character and providing an output signal indicative of a positive or negative identification.

10. The system of claim 9, wherein said comparing means includes a neural network comprising:
an input layer including a plurality of neuron-like units, wherein each neuron-like unit includes a receiving channel for receiving one of said digitized output signal generated from said human image and said output signal generated from said universal face space, wherein said receiving channel includes predetermined means for modulating said one of said digitized output signal generated from said human image and said output signal generated from said universal face space;
a hidden layer having a plurality of neuron-like units individually receptively connected to each of said units of said input layer, wherein each said connection includes a predetermined means for modulating each said connection between said input layer and said hidden layer;
an output layer having a plurality of neuron-like units individually receptively connected to each of said units of said hidden layer, wherein each said connection includes predetermined means for modulating each connection between said hidden layer and said output layer, and wherein each said unit of said output layer includes an outgoing channel for transmitting a modulated signal indicative of a positive identification or negative identification.

11. A document cashing system comprising:
user means for storing a human facial image projection character;
a machine for performing financial transactions including the dispensing of cash; said machine comprising:
means for retrieving said human facial image projection character and capable of manipulating said projection character to produce an output signal indicative of a human facial feature for use in verification of the user, which includes universal face space memory indicative of facial features for non-homogeneous population and wherein said output signal is generated by projecting said universal face space memory;
mean for receiving and displaying said output signal of said human facial feature;
video camera means for gathering a human facial image; and
means for digitizing said human facial image and for producing a digitized output signal, wherein said retrieving and manipulating means is further capable of receiving said digitized output to produce another human facial image projection character, and further includes means for comparing said human facial image projection character and said another human facial image projection character and providing an output signal indicative of a positive or negative identification; and means for manually entering data to perform said financial transactions.

12. The system of claim 11, wherein said user means is further characterized to include a set of human facial image projection characters and wherein said receiving and manipulating means is further characterized to manipulate said set of projection characters to produce an output signal indicative of a human facial image.

13. A secure area access system comprising:

user means for storing a human facial image projection character;

a machine for controlling personel access to a secure area, said machine comprising:

means for retrieving said human facial image projection character and capable of manipulating said projection character to produce an output signal indicative of a human facial feature for use in verification of the user, which includes universal face space memory indicative of facial features for a non-homogeneous population and wherein said output signal is generated by projecting said human facial image projection character into said universal face space memory;

means for receiving and displaying said output signal of said human facial feature;

video camera means for gathering a human facial image;

means for digitizing said human facial image and for producing a digitized output signal, wherein said retrieving and manipulating means is further capable of receiving said digitized output signal to produce another human facial image projection character, and further includes means for comparing said human facial image projection character and said another human facial image projection character and providing an output signal indicative of a positive or negative identification; and means for operating said automated locking mechanisms upon proper identification of said personel.

14. The system of claim 13, wherein said user means is further characterized to include a set of human facial image projection characters and wherein said receiving and manipulating means is further characterized to manipulate said set of projection characters to produce an output signal indicative of a human facial image.

* * * * *